Nov. 5, 1968    H. L. PENBERTHY    3,409,725
FURNACE ELECTRODE ASSEMBLY
Filed April 20, 1965    2 Sheets-Sheet 2

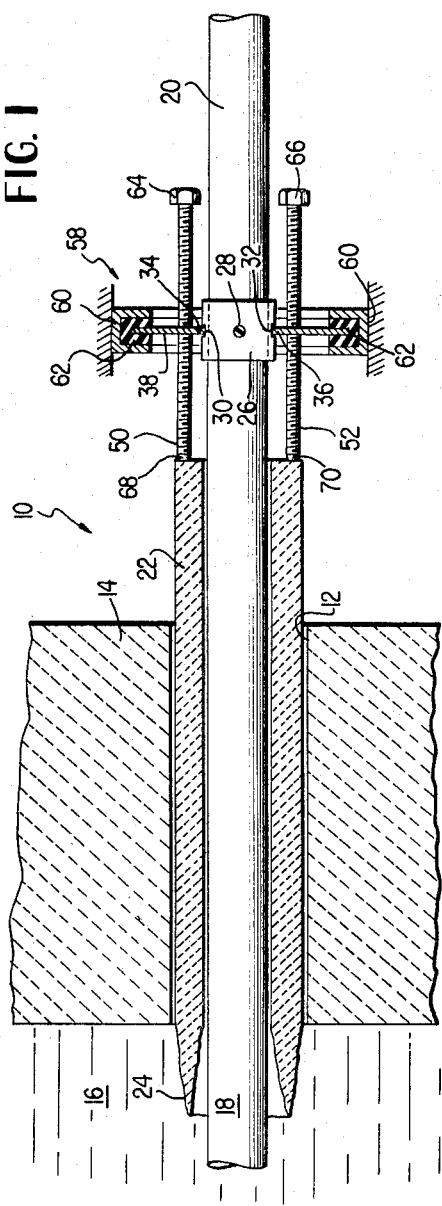
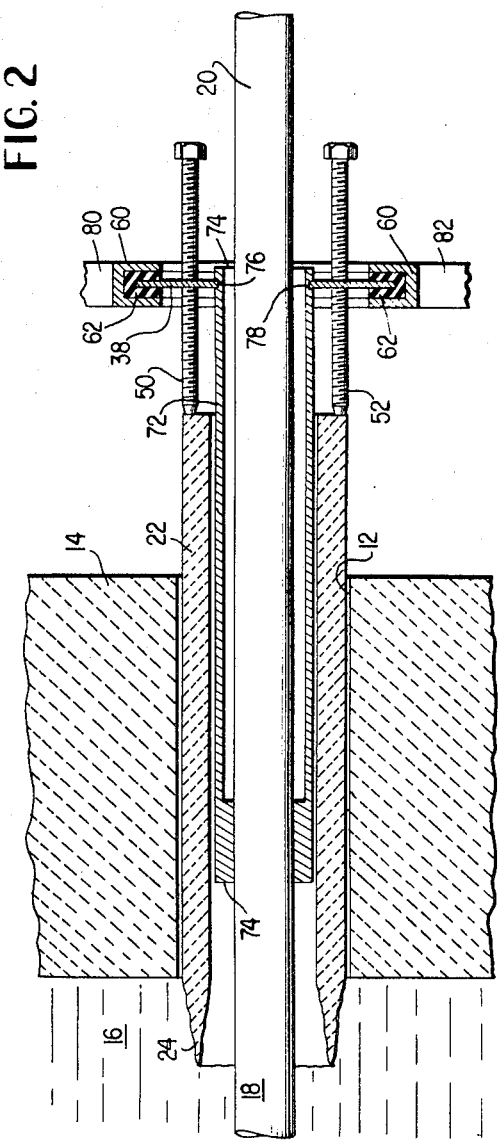
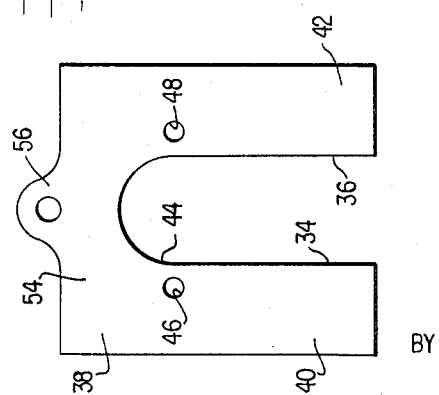

INVENTOR.
HARVEY LARRY PENBERTHY

BY    ATTORNEYS.

United States Patent Office 3,409,725
Patented Nov. 5, 1968

3,409,725
FURNACE ELECTRODE ASSEMBLY
Harvey Larry Penberthy, 5624 SW. Admiral Way,
Seattle, Wash. 98116
Filed Apr. 20, 1965, Ser. No. 449,590
14 Claims. (Cl. 13—6)

ABSTRACT OF THE DISCLOSURE

An electrode assembly has a consumable electrode extending through an aperture in the wall of a glass furnace. A sleeve encompasses the electrode and is formed of a material having a higher electrical resistivity than the material forming the furnace wall. The sleeve shields the adjacent furnace wall to prevent corrosion and the formation of cracks therein. The sleeve is mounted for sliding movement into the furnace either concurrently with or relative to the electrode to maintain an electrical shield about the electrode as the inner ends of the sleeve and electrode are consumed in the furnace.

---

This invention relates to electric glass making furnaces and more particularly to a novel refractory sleeve for surrounding the one or more heating elements of a glass furnace to prevent undesirable reactions in the furnace walls adjacent the electrode or electrodes. Electric furnaces for making a wide variety of glasses have been known for many years. Perhaps the most common type is a continuous furnace wherein glass batch material is continuously fed through one or more dog houses to melting and fining zones where heat is applied to the batch material so as to melt and refine it. The melted glass customarily passes beneath a bridge wall into a working zone from which it is withdrawn to form an ultimate product. In certain instances heat may be applied to the glass materials in the working zone as well as in the melting and fining zones so as to maintain proper temperature control of the glass.

The extremely high temperatures necessary to melt the glass batch are more often than not obtained from combustible gasses playing over the batch and molten glass surface in at least the melting zone of the furnace with the products of combustion exhausting through suitable vents in the furnace crown. More recently, it has become customary to augment the external or gas flame type heating of the glass by means of two or more electrodes submerged in the molten glass so as to internally heat the molten material. These electrodes result in the flow of a substantial amount of heating current through the conductive molten glass producing what is commonly referred to as Joule effect heating. These Joule effect electrodes are also sometimes used in the fining and working zones of the furnace. With the advent of the more satisfactory electrode materials such as molybdenum and the like, all-electric furnaces depending solely upon heating electrodes have gained wider commercial acceptance.

In the practice of electrical boosting and electric melting using a standard molybdenum electrode passing through the refractory walls of a glass furnace an effect has been noticed whereby the wall block adjacent the electrode is corroded by the glass bath much faster than an adjacent furnace block not carrying an electrode. The furnace walls customarily comprise blocks of a fusion-cast refractory, one type having a trade name "Zac." The wear on the electrode block has been observed to be quite localized, usually extending away from the electrode in a generally circular configuration for about six or eight inches.

This electrode block wear is highly undesirable in that it leads to exposure of the electrode holder with the consequent inability to cool the electrode and ultimately results in the premature failure of the electrode block of the furnace and hence reduces the furnace life.

Coupled with the localized corrosion of the refractory block around the electrode, another phenomenon has appeared. Cracks occur in the electrode blocks radiating from the electrode hole. While the cracking can be explained in terms of the differential temperatures due to the cooled electrode, the added phenomenon of crack widening is not so easily explained. Many cracks in adjacent electrodes have been noted to be up to one-half inch in width. Obviously, the widening of cracks is not due to inherent stress in the block when manufactured, because the initial hairline crack relieves the stress which may have caused it.

While several causes have been postulated for the excessive refractory block erosion in the vicinity of an electrode, the answer is believed to lie in the high voltage gradient extending outwardly from the electrode. Although the conditions within an operating furnace make it quite difficult to obtain accurate measurements within the furnace, it has been determined that approximately 10% of the voltage drop between electrodes in a glass furnace is concentrated in a region within four inches of the electrode. Thus, a furnace having an applied voltage of 120 volts will have a voltage drop of approximately 12 volts in the path from the electrode to points in the molten glass only four inches away. This same voltage gradient exists adjacent to the refractory blocks in the furnace and also in the block itself, primarily adjacent its inner surface, since at conventional melting temperatures the commonly used fusion cast refractories have a significant electrical conductivity.

In order to avoid premature destruction of the refractory block material in the furnace surrounding the electrode the present invention provides a novel movable refractory sleeve about the electrode which sleeve preferably has an increased electrical resistance over that of materials commonly used in forming the walls of a glass furnace. As the inner end of the sleeve is consumed within the furnace it is advanced so as to constantly shield the electrode from the surrounding furnace wall, completely obviating premature destruction of the furnace wall and the necessity for shutting down the furnace and rebuilding the wall as has been previously the case. The refractory material of the sleeve should preferably not only have an increased eletcrical resistance but should also be usable in contact with the molten glass, i.e., have a good resistance to glass corrosion. By increasing the electrical resistivity of the sleeve the amount of Joule effect heat which is liberated within the surface skin of the refractory adjacent the electrode is reduced.

Although it has been proposed in the past to surround a furnace electrode with a refractory sleeve this has generally been for the purpose of concentrating the electrical current and hence the Joule effect heat at the inner active end of the electrode. Insofar as applicant is aware, it has not been previously proposed to substantially increase the resistivity of the refractory material surrounding the electrode or to make the refractory sleeve projecting into the molten glass adjustable so as to continuously compensate for erosion of the inner end of the refractory sleeve as it is consumed in the furnace. The novel consumable sleeve of the present invention may be used in conjunction with either a cooled or uncooled electrode and may be used not only with molybdenum electrodes but also with other electrode materials including carbon or conductive ceramic oxide such as tin oxide electrodes.

It is therefore one object of the present invention to provide a new and improved glass furnace wherein at least some of the heat of the furnace is derived from electrodes projecting into the furnace.

Another object of the present invention is to provide a novel arrangement for minimizing furnace wall erosion in the vicinity of a Joule heating type furnace electrode.

Another object of the present invention is to provide a consumable refractory sleeve for glass furnace electrodes.

Another object of the present invention is to provide an arrangement for increasing the electrical resistance of the refractory material surrounding a furnace electrode.

Another object of the present invention is to provide an arrangement for advancing a ceramic sleeve into a glass furnace as its inner end is consumed by the molten glass.

Another object of the present invention is to provide a novel method for protecting the walls of a glass furnace in the area surrounding a heating electrode. This is accomplished by advancing a refractory sleeve surrounding the electrode further into the molten glass as its inner end is consumed. The sleeve may be used in conjunction with either a cooled or uncooled electrode and provision is made for advancing the electrode itself as well as the surrounding sleeve either simultaneously or independently of each other. Through the choice of suitable sizes and materials in conjunction with the other operating conditions in the furnace it is possible to construct the protective refractory sleeve so that its rate of advance is equal to that of the electrode, i.e., both are consumed at approximately the same rate. In the preferred embodiment the electrical resistance of the sleeve is substantially higher, i.e., at least an order of magnitude higher than the electrical resistance of the material forming the refractory wall or lining of the glass furnace.

These and further objects and advantages of the invention will be more apparent upon reference to the following specification, claims and appended drawings wherein:

FIGURE 1 is a horizontal cross-section through a portion of a glass furnace constructed in accordance with the present invention showing an arrangement for advancing a refractory sleeve surrounding an uncooled furnace electrode.

FIGURE 2 is a view similar to that of FIGURE 1 illustrating an advancable protective sleeve around an electrode passing through a water cooled electrode holder.

FIGURE 3 is a front elevation of a lock plate used in the arrangement of FIGURES 1 and 2.

Figure 4:
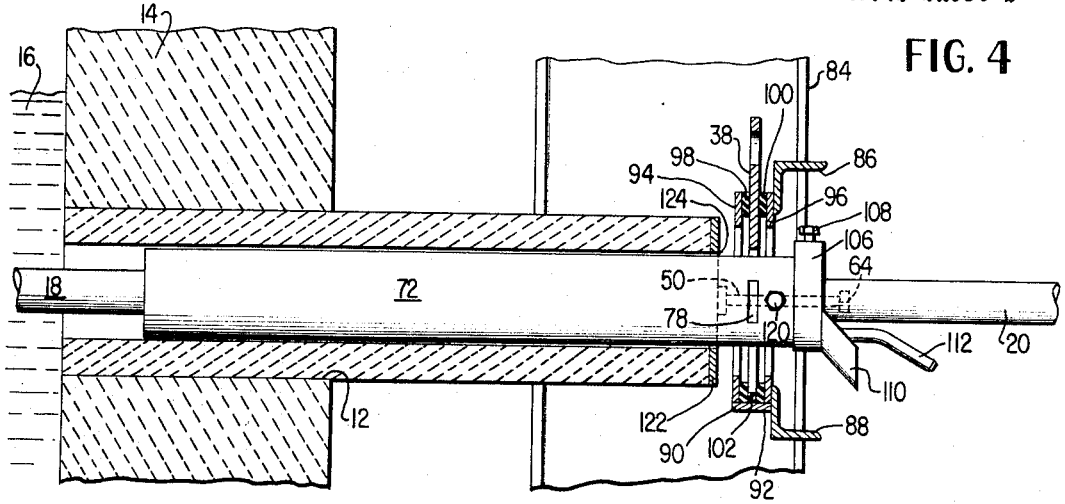
FIGURE 4 is a view similar to FIGURES 1 and 2 showing a further embodiment of the consumable refractory sleeve and advancing mechanism of the present invention.

Referring to the drawings and particularly to FIGURE 1, there is shown an electrode assembly constructed in accordance with the present invention and generally indicated at 10 passing through a suitable aperture 12 formed in a refractory block 14. Block 14 constitutes a portion of the wall or in some instance the inner lining of a conventional continuous glass making furnace. Refractory block 14 in accordance with current practice is usually formed of a fusion cast refractory, one of which bears the trade name "Zac," customarily having an electrical resistivity of about 100 ohm centimeters at the molten temperature of the glass within the furnace. The furnace is illustrated as at least partially filled with molten glass at 16 in FIGURE 1.

Passing through refractory block 14 with its electrically active inner end 18 submerged in the molten glass 16 is a conventional elongated conductive rod or electrode 20 preferably made of molybdenum. Electrode 20 is adapted to be advanced by means (not shown) further into the molten glass as its inner end 18 is consumed during operation of the furnace. The electrode 20 cooperates with other electrodes projecting into the molten glass at spaced points in the furnace in a well-known manner to provide Joule effect heat to the glass bath. The electrode may constitute part of an auxiliary heat supply to the molten bath used in conjunction with flame heating or may constitute part of a furnace completely heated by electricity.

Surrounding the portion of electrode 20 passing through refractory block or wall 14 of the furnace is a protective refractory sleeve 22 preferably formed of a material having an electrical resistance at molten glass temperatures well in excess of the electrical resistance of refractory 14. At the same time the refractory sleeve 22 must possess good resistance to glass erosion as is customarily the case with the refractory block 14. In the preferred embodiment refractory sleeve 22 is made of a commercially available refractory material known by the trade name "Crystalite A" which is sillimanite material having a low alkali content. This material possesses an electrical resistivity of about 1200 ohm-centimeters as compared with about 100 ohm-centimeters for materials conventionally used for the refractory walls of a glass furnace. Other sillimanite materials may be used irrespective of the alkali content but better electrical insulation is obtained when the alkali content is low. It is also possible to use ordinary clay of a quality intended to be used against molten glass, or fusion-cast alumina-zirconia-silica materials, such as those sold under the trade names "Zac" and "Monofrax." Sillimanite itself is an alumina-silica composition having the formula $Al_2SiO_5$.

As discussed above, the higher the electrical resistance of the sleeve 22 at molten glass temperatures, the slower the inner end of the sleeve will be worn away or eroded by the glass.

However, irrespective of the electrical resistivity of the refractory sleeve 22, some inner end erosion during operation does occur as illustrated at 24 in FIGURE 1 and for this reason the present invention contemplates a novel arrangement for advancing the protective refractory sleeve into the bath as the inner end 24 is worn away. This movement may be either in conjunction with similar movement of the electrode 20 as it is consumed or it may be independent of electrode movement.

FIGURE 1 illustrates an arrangement wherein the electrode is not cooled and where the movement of the protective sleeve 22 is completely independent of electrode movement. In this embodiment electrode 20 is provided with an annular collar 26 releaseably secured to the electrode by one or more set screws such as is indicated at 28. Opposite sides of the collar are provided with vertical grooves or slots 30 and 32 which slidably receive the inner edges 34 and 36 of a locking plate 38. This plate is shown in more detail in FIGURE 3 as of substantially U-shaped configuration defining a pair of legs 40 and 42 spaced by a central opening 44 of which the inner edges 34 and 36 of the legs form a part. Near the upper end of the legs 40 and 42 are a pair of tapped holes 46 and 48 adapted to receive the threaded jack screws 50 and 52 respectively of FIGURE 1. The body portion 54 of the lock plate is provided with an up-standing lug 56 forming a finger grip or handle by means of which the plate may be inserted and removed from a supporting framework generally indicated at 58 in FIGURE 1. The framework 58 comprises a generally U-shaped channel member 60 open at the top and which contains or retains a similar but smaller U-shaped insulator 62. This latter electrically insulates the locking plate from the supporting metal frame 60. The outer edges of the legs 40 and 42 of the locking plate are slidably received in and retained against longitudinal movement by insulator 62 and framework 60.

As the inner end 24 of the sleeve 22 is consumed the sleeve may be advanced by applying a socket wrench or similar tool to the heads 64 and 66 of the jack screws 50 and 52 to advance the screws through the locking plate 38. The ends of the screws, as indicated at 68 and 70, bear against the right hand end of the sleeve 22 to force it through the refractory block aperture 12 and further into the bath 16. With the refractory sleeve 22 formed of the Crystallite A sillimanite refractory material previously described, satisfactory operation is obtained if the sleeve 22 of FIGURE 1 is advanced approximately ⅛-inch into the bath each 24 hours.

FIGURE 2 shows a modified embodiment wherein the electrode is cooled and with like parts bearing like reference numerals. Again the refractory sleeve 22 surrounds electrode 20 and is adapted to be advanced into the glass bath 16 through aperture 12 in the refractory furnace wall block 14. In this embodiment the electrode 20 is surrounded over a portion of its length by a cooling jacket or electrode holder 72 of the type shown in U.S. Patent 2,693,498. Reference may be had to that patent for the details of the cooling sleeve construction but briefly the sleeve includes an integral thickened annular end 74 and is adapted to receive circulating cooling fluid such as water which cools the electrode. Electrode holder 72 adjacent its right hand end 74 is provided with a pair of vertical slots or grooves 76 and 78 adapted to slidably receive the inner edges 34 and 36 of locking plate 38. Again advancement of the sleeve 22 into the bath is by means of jack screws 50 and 52 threaded through the apertures 46 and 48 in locking plate 38. Supporting frame 60 is illustrated in FIGURE 2 as supported from the furnace steel as indicated at 80 and 82. It is of course understood that the frame 60 of FIGURE 1 is similarly supported from the furnace framework.

Figure 5:
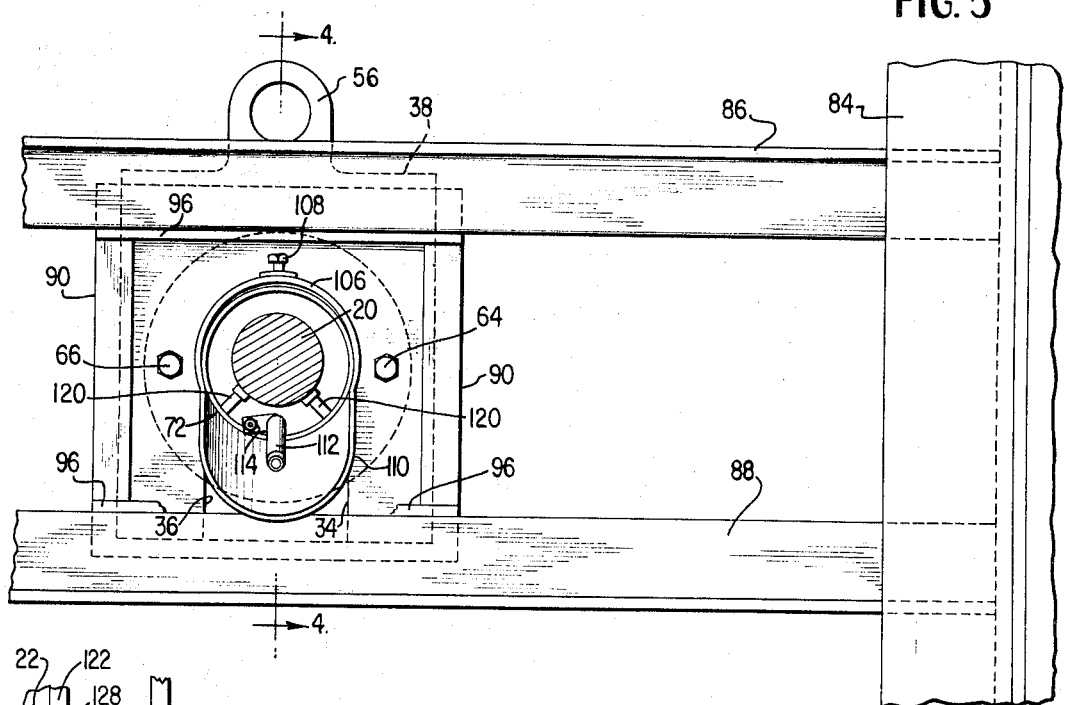
FIGURE 5 is a front view of the assembly of FIGURE 4.

FIGURE 4 shows a further modified embodiment of the present invention wherein the refractory sleeve 22 is movable in conjunction with or independently of the electrode 20. As opposed to FIGURES 1 and 2 which are horizontal cross-sections, FIGURE 4 shows a vertical cross-section taken along line 4—4 of FIGURE 5, this latter constituting a front elevation of the embodiment of FIGURE 4. Again, like parts bear like reference numerals. In FIGURES 4 and 5 the assembly is supported from a pair of furnace framework buck stays, one of which is illustrated at 84, by means of a pair of transverse horizontal angle irons 86 and 88. These angle irons are welded or otherwise suitably secured to a metal frame 90 comprising a bottom plate 92 and a pair of spaced hollow rectangular end plates 94 and 96. Retained by these plates are a pair of hollow rectangular electrical insulators 98 and 100 and a U-shaped central electrical insulator 102. These latter elements may be formed of any good electrical insulating material so as to electrically insulate locking plate 38 from the metal frame 90.

Surrounding the right-hand end of the electrode holder 72 which is again constructed in the manner illustrated in U.S. Patent 2,693,498 is a spout clamp 106 provided with a screw 108 for securing it to the end of the holder. Spout clamp 106 carries a spout 110 for exhausting cooling fluid from holder 72. The cooling fluid (water) is supplied to the holder by way of an inlet tube 112 supported from the holder by means of a suitable bracket 114 illustrated in FIGURE 5. Water enters through inlet tube 112 to cool the electrode and electrode holder and exits by way of the spout 110 in a manner such that it is continuously circulated through the holder. Electrode 20 is supported for movement through the holder by a plurality of set screws such as those illustrated at 120 in FIGURES 4 and 5.

Figure 6:
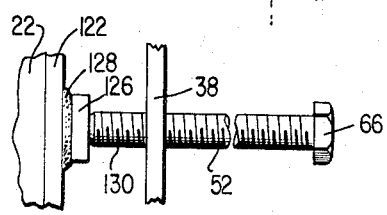
FIGURE 6 is an enlarged view showing the details of one of the advancing screws for the sleeve of FIGURES 4 and 5.

Suitably secured to the right hand end of the refractory sleeve 22 is an annular pressure plate 122. Welded or otherwise suitably secured to pressure plate as best seen in FIGURE 6 is a pressure pad or block 126 illustrated as welded at 128 to the pressure plate. Two such blocks 126 are provided, one for each of the jack screws 50 and 52. As indicated at 130, the inner end of the jack screw bears against the pressure pad 126 so that advancement of the screw through the threaded aperture in locking plate 38 advances the refractory sleeve through the cored hole 12 in refractory block 14.

Figure 7:
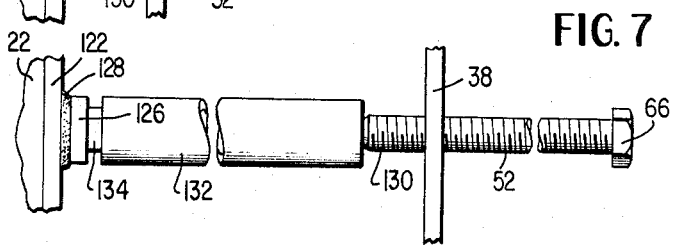
FIGURE 7 is a view similar to that of FIGURE 6 showing an extension arrangement for the advancing assembly.

FIGURE 7 illustrates an arrangement for further advancing the refractory sleeve 22 by means of an extension insert 132. This insert comprises a hollow tubular member terminating in a solid block 134 adapted to press against pressure pad 126. When the refractory sleeve 22 has been advanced as far as it can by the jack screws 50 and 52 they are backed off and the threaded end of each jack screw is threaded into the right hand end of extension inserts such as 132. The right hand end of each insert is suitably provided with internal threads for attachment to the end of the jack screw. By means of these inserts further insertion of the refractory sleeve may be obtained.

It is apparent from the above that the present invention provides a novel arrangement and method for reducing the wear of electrode refractories in glass furnaces. Instead of wearing away the wall of the furnace, the voltage gradient adjacent the electrode wears away a consumable protective refractory sleeve which may be advanced into the bath as it is consumed. This greatly increases the life of the furnace wall adjacent the electrodes, significantly decreasing the cost of operating the furnace by eliminating the need for periodic shutting down of the furnace and rebuilding the damaged portion of the furnace wall. In the preferred embodiment the refractory sleeve is formed from a material not only possessing good resistance to molten glass but also one which exhibits a much higher electrical resistivity at molten glass temperatures than do the customary furnace lining refractory materials. Sillimanite materials, i.e., alumina-silica compositions having a low alkali content, are preferred.

The operation of one embodiment constructed in accordance with that shown in FIGURES 4 and 5 involved inserting a twelve-inch long refractory sleeve 22 of sillimanite material through a 6⅛ inch diameter cored hole 12 in the electrode block 14. The jack screws 50 and 52 provided for a movement of up to six inches for the sleeve into the bath. By backing off the bolts and inserting the extension members 32, it was possible to gain an additional 6½ inches of movement for the sleeve. By simply removing the spout clamp 106, the water inlet tube 112 and the thermocouple 114, a new 12-inch long refractory sleeve can be inserted over the holder to take the place of sleeve 22 after it has been fully consumed. Alternatively, the replacement sleeve can be slit lengthwise in two halves. In this case, the halves can be put in place without removing parts 106, 112, and 114. A temporary band holds the halves together until the ends are inside hole 12.

The arrangements constructed in accordance with the present invention include utilization of the protective refractory sleeve both when a water cooled electrode holder is provided and when the electrode holder is not used. When it is desired to move the sleeve and electrode together the set screws 120 in the holder bearing against the electrode are loosened and the sleeve and the electrode move together. It is not necessary to clamp the electrode to the refractory sleeve even though only the sleeve is pushed, because of the stiff glass in the annular space between the electrode and sleeve. When the sleeve is to be moved independently of the electrode set screws 120 retain the electrode against movement and rotation of the jack screws causes only the refractory sleeve to move. The force required to move the sleeve by the jack screws 50 and 52 is in the order of 2,000 pounds. It is of course apparent that in some cases it may be desirable to seal the refractory sleeve to the electrode by cement so that both move simultaneously at all times. For some applications, this arrangement results in a balanced structure in which the electrode dissolves in the glass at approximately the same rate as the refractory sleeve. By means of the refractory sleeve, the wearing away and widening of cracks in the furnace wall adjacent the Joule effect electrodes in a glass furnace are minimized or substantially eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An electrode assembly for an apertured furnace wall comprising an elongated furnace electrode, a refractory sleeve surrounding a portion of said electrode, locking means releasably coupled to said electrode, stationary means for supporting said locking means, and pressure means acting between said locking means and one end of said sleeve for advancing said sleeve into a furnace relative to said electrode.

2. An electrode assembly for an apertured furnace wall comprising a longitudinally movable, elongated furnace electrode, a refractory sleeve surrounding said electrode, a collar around said electrode, means securing said collar to said electrode, a support frame, electrical insulating means in said frame, a substantially U-shaped locking plate slidably received in said frame but spaced therefrom by said insulating means, said collar including a pair of parallel grooves slidably receiving the legs of said U-shaped locking plate, said locking plate including a pair of tapped holes, and a jack screw passing through each of said holes and bearing against one end of said sleeve.

3. An assembly according to claim 2 wherein said collar comprises an electrode holder surrounding said electrode between said electrode and said sleeve, and means for passing an electrode cooling fluid through said electrode holder.

4. In a glass furnace, a refractory wall having an aperture therein, an electrode, a refractory sleeve surrounding said electrode with one end of said sleeve terminating adjacent the active end of said electrode, said sleeve and electrode engaging through said aperture for subsurface entry into the molten glass in the furnace, and means coupled to said sleeve for advancing said sleeve toward said active end of said electrode.

5. Apparatus according to claim 4 wherein said wall comprises a side wall of said furnace.

6. Apparatus according to claim 4 including means for moving said refractory sleeve into said furnace independent of and relative to said electrode.

7. Apparatus according to claim 4 including means for moving said electrode and said sleeve simultaneously into said furnace.

8. In the glass furnace according to claim 4 wherein the sleeve has a resistivity of such value in relationship to the resistivity of the refractory wall as to reduce wear, cracking or corrosion of the refractory wall due to Joule effect currents.

9. An electrode assembly for an apertured furnace wall comprising an elongated furnace electrode, a refractory sleeve surrounding a portion of said electrode, locking means releasably coupled to said electrode, stationary means for supporting said locking means, pressure means acting between said locking means and one end of said sleeve for advancing said sleeve into a furnace relative to said electrode, and a collar around said electrode having a recess therein, said locking means electrically insulating said electrode from said frame and including a rigid member projecting into said recess.

10. An assembly according to claim 9 wherein said collar comprises a portion of a water-cooled electrode holder.

11. An electrode assembly for an apertured furnace wall comprising an elongated furnace electrode, a refractory sleeve surrounding a portion of said electrode, locking means releasably coupled to said electrode, stationary means for supporting said locking means, pressure means acting between said locking means and one end of said sleeve for advancing said sleeve into a furnace relative to to said electrode, a collar around said electrode having at least one groove therein, and an electrically insulated frame, said locking means being supported in said frame and having a portion slidably received in said groove.

12. In a glass furnace, a refractory wall having an aperture therein, an electrode, a consumable refractory sleeve surrounding said electrode with one end of said sleeve terminating adjacent the active end of said electrode, said sleeve and electrode passing through said aperture for subsurface entry into the molten glass in the furnace, said sleeve being mounted for movement relative to said wall and being formed of a material having an electrical resistivity greater than the electrical resistivity of the material forming the furnace wall, and means coupled to said sleeve for advancing said sleeve toward the active end of said electrode.

13. An apparatus according to claim 12 wherein said sleeve is made of sillimanite.

14. An assembly according to claim 12 wherein said sleeve is made of a material having an electrical resistivity of at least about 1000 ohm-centimeters.

References Cited

UNITED STATES PATENTS

| | | | |
|---|---|---|---|
| 2,693,498 | 11/1954 | Penberthy | 13—6 X |
| 2,851,287 | 9/1958 | Tanguard | 13—16 X |
| 2,978,526 | 4/1961 | Olson | 13—6 X |
| 3,291,955 | 12/1966 | Shrubsall et al. | 219—73 |

OTHER REFERENCES

Smithsells, C. J., Metals Reference Book, 1962, 3rd ed., pp. 968–969, Butterworth, Inc., Washington, D.C.

BERNARD A. GILHEANY, *Primary Examiner.*

H. B. GILSON, *Assistant Examiner.*